United States Patent
McAnally, Jr.

(10) Patent No.: US 6,231,048 B1
(45) Date of Patent: May 15, 2001

(54) MECHANICAL SEAL INCORPORATING A PUSHER RING FOR SAFE AND EASY ASSEMBLY AND REPAIR

(76) Inventor: William B. McAnally, Jr., c/o MacTec Services, 24221 Creekwood, Splendora, TX (US) 77372

(*) Notice: Subject to any disclaimer, the term of this patent is extended or adjusted under 35 U.S.C. 154(b) by 0 days.

(21) Appl. No.: 09/327,218

(22) Filed: Jun. 7, 1999

(51) Int. Cl.$^7$ ...................................................... F16J 15/34
(52) U.S. Cl. .......................... 277/520; 277/511; 277/371; 277/370
(58) Field of Search ................................ 277/551, 371, 277/370, 511, 520

(56) References Cited

U.S. PATENT DOCUMENTS

| | | | |
|---|---|---|---|
| 889,740 | * | 6/1908 | Young .............................. 277/520 X |
| 896,190 | * | 8/1908 | Young .............................. 277/520 X |
| 1,817,867 | * | 8/1931 | Bailey .............................. 277/520 X |
| 2,726,882 | * | 12/1955 | Ryant, Jr. ......................... 277/520 X |
| 2,818,284 | * | 12/1957 | Stevens ............................. 277/370 |
| 2,818,285 | * | 12/1957 | Greiner ............................ 277/371 |
| 3,176,996 | * | 4/1965 | Barnett ............................ 277/520 X |
| 3,388,913 | * | 6/1968 | Tracy ................................ 277/371 |
| 3,403,915 | * | 10/1968 | Roberts ............................. 277/511 |
| 3,578,342 | * | 5/1971 | Satterthwaite .................... 277/511 |
| 4,060,353 | * | 11/1977 | Akimoto et al. ................. 277/520 X |
| 4,342,461 | | 8/1982 | Lindsay ............................. 277/30 |
| 4,410,190 | | 10/1983 | Potter ............................... 277/153 |
| 4,438,936 | | 3/1984 | Schlegel ........................... 277/212 |
| 4,502,695 | | 3/1985 | Choi .................................. 277/12 |
| 4,538,821 | | 9/1985 | Wallace ............................. 277/81 |
| 4,596,394 | | 6/1986 | Schmitt ............................. 277/38 |
| 4,819,950 | * | 4/1989 | Winslow ....................... 277/371 X |
| 5,013,053 | * | 5/1991 | Champlin ..................... 277/511 X |
| 5,129,625 | * | 7/1992 | Wood et al. ................. 277/520 X |
| 5,199,720 | | 4/1993 | Radosav et al. ................... 277/81 |
| 5,244,215 | | 9/1993 | Cather, Jr. et al. .................. 277/1 |
| 5,441,282 | | 8/1995 | Ciotola ............................... 277/85 |
| 5,460,386 | | 10/1995 | McCoy et al. ....................... 277/9 |
| 5,462,287 | | 10/1995 | Hering et al. ..................... 277/37 |
| 5,513,556 | * | 5/1996 | Schaefer ........................ 277/520 X |
| 5,544,897 | | 8/1996 | Di Pietro et al. .................. 277/81 |
| 5,647,598 | | 7/1997 | Vaudolon ........................... 277/59 |
| 5,727,792 | | 3/1998 | Rockwood ............................ 277/9 |

OTHER PUBLICATIONS

Fluidtec Engineered Products catalog (Date unknown).

* cited by examiner

Primary Examiner—Terry Lee Melius
Assistant Examiner—Robert G. Santos
(74) Attorney, Agent, or Firm—Law Offices of K. Patrick McKay

(57) ABSTRACT

An improved mechanical seal incorporating a pusher ring to hold the integral parts of the seal together, in lieu of a typical retaining ring and snap ring aligning and compressing the gland plate. The improvement consists of a pusher ring, fixedly attached to the seal body gland face with cap screws, which retains the gland plate, allowing for easy and safe repair and assembling.

1 Claim, 3 Drawing Sheets

MECHANICAL SEAL INCORPORATING A PUSHER RING FOR SAFE AND EASY ASSEMBLY AND REPAIR

FIELD OF THE INVENTION

The present invention relates to a mechanical seal incorporating a pusher ring to hold the integral parts of the seal together, in lieu of a snap ring. Socket head cap screws are inserted through the plate and threaded into the gland face, allowing for ease of repair and assemblage without the danger of possible injury from any part of the seal.

DESCRIPTION OF THE PRIOR ART

A mechanical seal provides a hydraulic seal between a rotatable element, typically, a shaft and a stationary housing of the apparatus. Such seals are associated with a fluid pump having a shaft extending through a pump housing wall, handling fluids of varying viscosity. The lower the viscosity of the fluid being handled, the tighter the seal required within the pump design.

Although these seals are most commonly employed on pump equipment, other fluid handling equipment also utilize mechanical seals. So, although the present invention is addressed in terms of pump applications, the invention is not restricted therein, but may be employed on all such equipment having mechanical seals.

The pump shaft is typically coupled to a motor through a motor shaft. The mechanical seal forms a seal between the pump shaft and the outer surface of the pump housing. Mechanical seals for such applications are commercially available and have been available for more than 25 years.

Seals, Generally

Seals, in their most common and most basic form, are known in the art and comprise rotatable components and stationary components which contact to form a seal at opposing sealing surfaces. The rotatable components include a shaft attachment means. Such a means is typically a sleeve having an inner perimeter surface which sealingly fits over the outer perimeter surface of the shaft and is connected to the shaft, by connecting means such as set screws. An "O" ring typically provides a seal between the shaft and the sleeve. There is a rotatable circumferential seal element interconnected to the sleeve so as to rotate when the shaft and sleeve rotate. The sleeve extends axially along the shaft.

The stationary components comprise a gland which extends circumferentially around the shaft. The gland abuts against the outer housing surface around the shaft. There is typically a sealing gasket interconnected to the gland and located between the gland and the housing. The gland functions as a base by which the seal is attached to the housing. The connection is typically accomplished by bolts extending from the outer housing wall. The bolts pass through slots or connecting extensions extending radially from the gland through the connecting slots or connecting extensions and secured with nuts. A stationary seal element is located between the inner circumferential surface of the gland facing the shaft (i.e. the gland inner surface) and the shaft. The stationary seal is directly or indirectly connected to the stationary gland. There are suitable means such as described in U.S. Pat. Nos. 4,832,351 and 4,989,882 to axially center the various stationary elements on the shaft. A circumferential spacing is maintained between the stationary elements, and the shaft and various of the rotating elements.

Mechanical Seals, Specifically

The mechanical seal also comprises rotatable components and stationary components. The rotatable components are interconnected to the shaft and rotate with the shaft. The stationary components are interconnected to the housing and do not rotate. The rotatable components and stationary components are positioned relative to each other so that a rotatable seal surface sealingly engages a stationary seal surface. Such a mechanical seal is particularly useful to form seals on machines which have rotatable shafts extending therefrom and fluid inside such as fluid pumps, i.e., water pumps, which have close tolerances, particularly in applications requiring the handling of caustic chemicals or flammable liquids. They are also widely used in nuclear reactor cooling systems to contain radioactive liquids. Typical mechanical seals are designed for leakage of less than one one-thousandth of one percent of the volume of the liquid pumped, per unit time.

The prior art mechanical seals date back to the early 1980's. They have existed for many years, as relative to this art. There has existed, however, safety concerns over a number of the seals because they generally employ snap rings on the seal which, while being installed or removed, can become projectiles which pose a threat to the mechanics.

Original designs used a heavy duty snap ring just inside the gland to hold the integral parts of the seal together. This snap ring was rated at upwards of 80,000 ft. lbs. of axial thrust load. This is more axial thrust load than any pump would ever experience with these seals, and was extreme for a snap ring as applied to these seals. Therefore, when the snap ring was removed, special pliers had to be employed, and risk of severe injury was possible because of the loaded spring causing the threat of projectiles.

Mechanical seals known in the art have at least one "O" ring associated with the sealing element being acted on, and in most instances, acted on by the spring. The spring forces this element toward the opposing element to form a seal. The "O" ring must form a seal not withstanding the axial movement and is known as a "dynamic-O" ring. Additionally, the dynamic "O" ring is located in an "O" ring slot which can clog. The spring must, therefore, provide force to cause the sealing elements to come together under sufficient pressure to form a seal while overcoming the resistance of the dynamic-O ring.

It would be desirable to eliminate the metal spring installed in concert with the dynamic "O" ring, and that is the present sense of the invention disclosed and claimed herein. The present invention retains all the favorable characteristics of the "O" ring, but without the disadvantages of snap ring and retaining rings, the mechanisms which create the dangerous tendency of the spring mechanisms in current art.

Additionally, the means to connect the mechanical seal to the housing is integrated into the structure of the stationary components. The mechanical seal is often set in place and removed in the small space between the pump and motor. The means to attach the seal takes up space and make access to the mechanical seal difficult for both installation and removal. A design with easier access to the seal elements at the location where the shaft extends from the housing is desirable, also an attribute of the present invention.

The present invention retains all the favorable characteristics of the "O" ring, but without the disadvantages of snap ring and retaining rings, the mechanisms which create the dangerous tendency of the spring mechanisms in current art.

PRIOR ART

U.S. Pat. No. 4,342,461, Lindsay, (Aug. 3, 1982) shows a seal assembly for sealing a rotary shaft including a rotary sealing cartridge and a stationary sealing cartridge and a flexible metal diaphragm secured to the face of the stuffing box. The use of the diaphragm eliminates the need for O-rings or springs for the purpose of self-alignment, and permits the seal assembly to accommodate caustic and high temperature fluids.

U.S. Pat. No. 4,410,190, Potter, (Oct. 18, 1983) demonstrates a sealing arrangement developed to reduce fluid pressure in the lip region wherein the annular gap between a shaft and a housing is sealed at an angle of 15°–30°.

U.S. Pat. No. 4,438,936, Schlegel, (Mar. 27, 1984) shows a secondary sealing element having a lip seal with a double contact ring to allow further dissipation of heat and low susceptibility to pressure in comparison to an O-ring.

U.S. Pat. No. 4,502,695, Choi, (Mar. 5, 1985) demonstrates a mechanical seal that prohibits leakage by providing reverse flow from an impeller secured to the shaft as the shaft rotates. O-rings are provided to prevent leakage during non-rotation. A seal cartridge is attached to a rear stuffing box by a locking bolt.

U.S. Pat. No. 4,538,821, Wallace, (Sep. 3, 1985) teaches a mechanical seal for a shaft comprising a housing having an end plate secured to it by bolts, and a sleeve secured to the shaft. The sleeve carries a rotary seal element and the end plate carries a stationary seal element. The sealing element consists of a brush carrying a single lipseal.

U.S. Pat. No. 4,596,394, Schmitt, (Jun. 24, 1986) demonstrates a cartridge seal comprising two rings that snap together to form the cartridge. Heat is dissipated through the radial leg of an inner ring from the sealing lip against the shaft or abutment. Also, during installation, there is no need for special adjustment of the inner ring relative to the outer ring before the cartridge seal is placed in service.

U.S. Pat. No. 5,199,720, Radosav et al., (Apr. 6, 1993) shows a mechanical seal capable of being easily removed and replaced without removing the housing. The assembly replaces packing in either stuffing boxes or defective mechanical face seals. A flanged lip at the end of a shaft sealing portion cooperates with a rotating holder, and a bolt screws into a threaded housing to mount the gland plate.

U.S. Pat. No. 5,244,215, Cather, Jr. et al., (Sep. 14, 1993) teaches a seal assembly with a primary and secondary lip arrangement supported by a center section allowing ease of installation.

U.S. Pat. No. 5,441,282, Ciotola, (Aug. 15, 1995) teaches a mechanical seal having an elastic element which forces the rotatable and stationary seal elements to sealingly engage. The seal is attached to the housing by removable clips.

U.S. Pat. No. 5,460,396, McCoy et al., (Oct. 24, 1995) demonstrates a lip seal for a shaft comprising a rubbery element encased by a rigid ring having an annular adjustment member. The member comprises a mounting portion and an inner portion forming an axially-projecting bearer which abuts the sealing element adjacent to the lip.

U.S. Pat. No. 5,462,287, Hering et al., (Oct. 31, 1995) shows a method for manufacturing a shaft seal comprising reusable die casting for the reception of the static gasket. Also, as a result of radial displacement of the sealing lip with respect to the shaft axis, frictional heat is removed due to the larger surface of the shaft being covered.

U.S. Pat. No. 5,544,897, Di Pietro et al., (Aug. 13, 1996) demonstrates a mechanical seal providing an inboard compressed packing seal between dual shaft sleeves and the pump shaft, compressed between the shaft sleeves by action of a plurality of radially arranged set screws. An annular channel provides a flow channel for a quenching fluid.

U.S. Pat. No. 5,647,598, Vaudolon, (Jul. 15, 1997) teaches a stuffing box seal where a locking bolt attaching the seal cartridge to the stuffing box holds the O-ring tightly. Lip-type sealing rings are pressed under effect of pressure and are deformable and incurved towards a collar step.

U.S. Pat. No. 5,727,792, Rockwood, (Mar. 17, 1998) shows a cartridge seal with a triple seal arrangement. The passageway along the pump shaft between the single seal and the radially inwardmost concentric seal is filled with a pressurized barrier inert gas so as to create a gas seal. A barrier liquid may also be disposed in the barrier chamber.

SUMMARY OF THE INVENTION

The improved mechanical seal of the present invention includes a pusher ring which eliminates the elastic spring element of the traditional type, but is still useful to force a rotatable seal surface into sealing contact with a stationary seal surface. The enhanced safety characteristics and ease of assembly/disassembly of the present invention will, therefore, become apparent.

The primary objective of the present invention is to provide a safer seal, particularly by eliminating the spring seal component.

A second objective of the present invention is to provide ease of installation and removal, again by eliminating the spring component, as augmented by the design of easily accessible pressure ring having socket head cap screws.

A third objective of the present invention is to provide an assembly which does not require special pliers for installation and removal.

A fourth objective of the present invention is to improve reliability by eliminating close tolerances which provide areas of the assembly which may clog and cause further mechanical problems.

The present invention achieves the objectives set forth by replacing the prior art components which are under spring tension with a simpler pusher ring which is bolted into the gland as described herein.

DETAILED DESCRIPTION OF THE PREFERRED EMBODIMENT

The invention method will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated device, and such further applications of the principles of the invention illustrated herein, as would normally occur to persons skilled in the art to which the invention relates.

Figure 1:
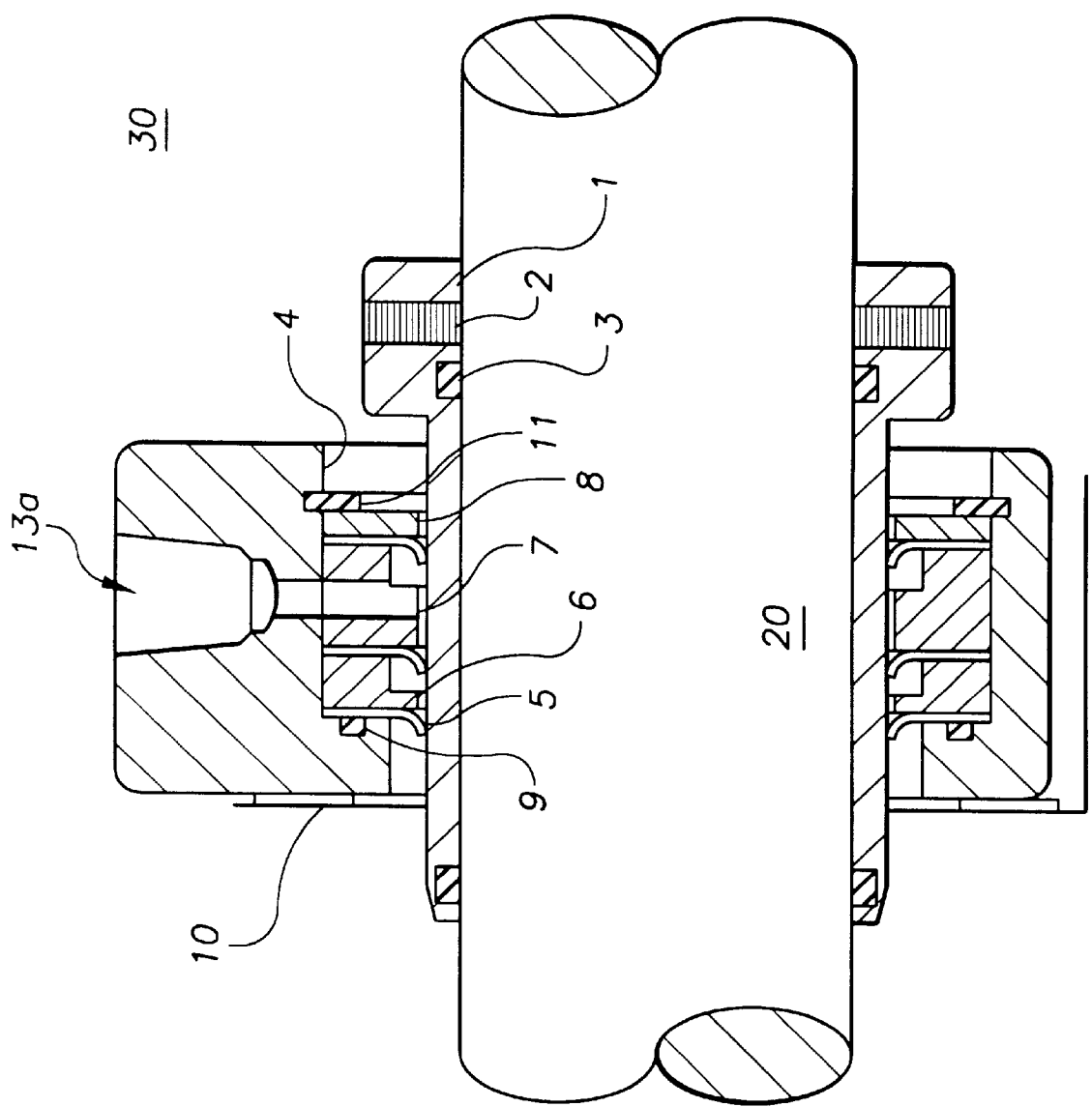
FIG. 1 is a longitudinal cross section of a prior art mechanical seal having a retaining ring and snap ring as the means for retaining the internal sealing components of the seal.

Referring now to FIG. 1, shown is the prior art mechanical seal 30. The basic components of the system include a drive sleeve 1 which is retained in place on the shaft 20 by set screw 3. This drive sleeve 1 is fixed relative to the shaft 20, and, therefore, rotates with the shaft 20 while the motor is operating. This drive sleeve 1 is the surface of the rotating shaft 20 against which the fluid seal is then formed, as follows. Gland Plate 4 acts as the mounting fixture for three elements 5 which act as a boundary against leakage between the shaft 20 and seal body 30. Sealing the elements 5 from the seal body 30 is the o-ring 9. Between the elements 5 are spacers 6 and 7. The elements 5 and spacers 6 and 7 are held against the o-ring 9 by the retaining ring 8, which is aligned and compressed by the snap ring 11.

Figure 2:
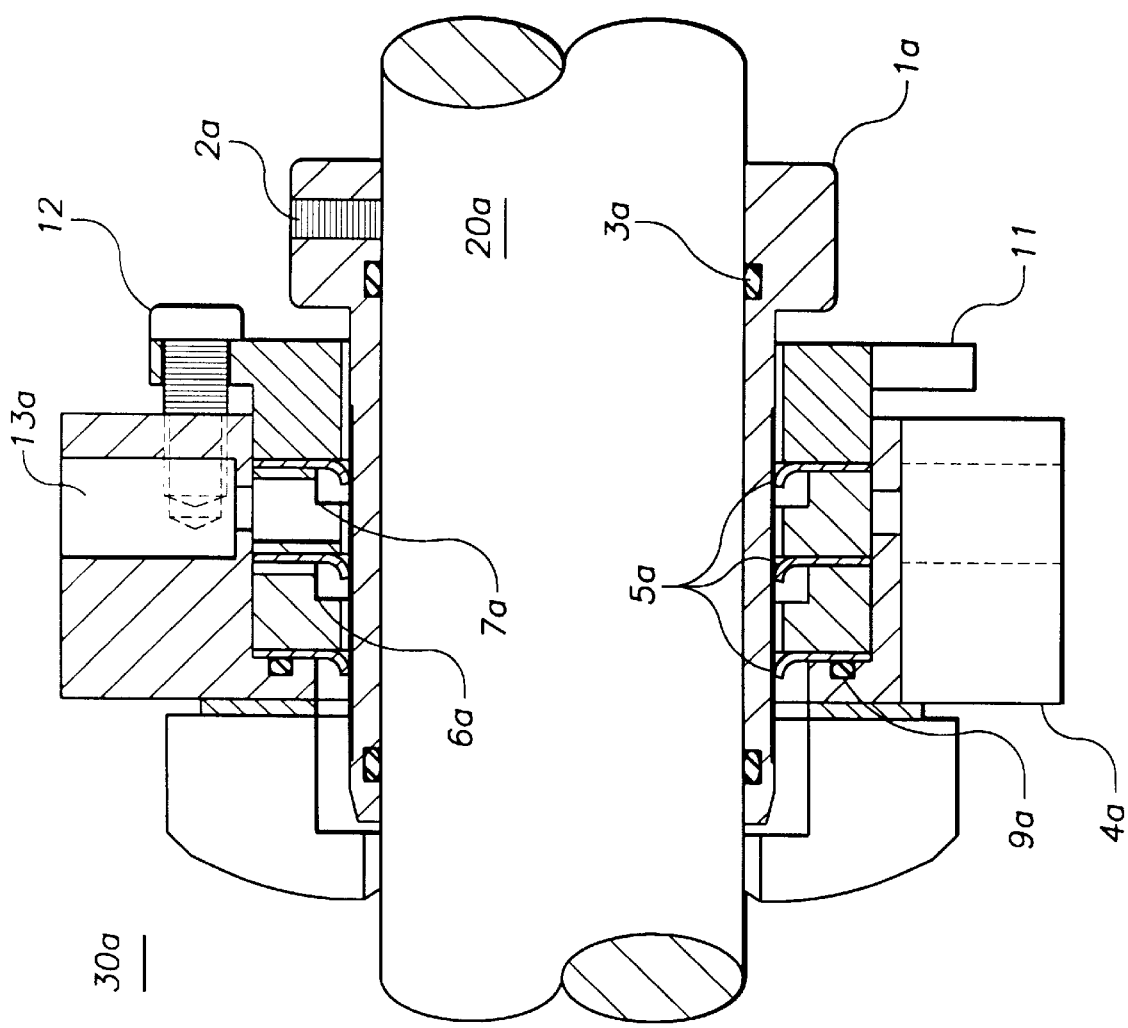
FIG. 2 is a longitudinal cross section of the present invention showing the pusher ring and bolt assembly which replaces the current art means for retaining the internal sealing components of the seal.

Referring now to FIG. 2, shown is the present invention, in terms of the prior art and as distinguished. Similar to FIG. 1, is shown mechanical seal 30a. The basic components of the system include a drive sleeve 1a which is retained in place on the shaft 20a by set screw 3a. This drive sleeve 1a is the surface of the rotating shaft 20a against which the fluid seal is then formed, as follows. Gland Plate 4a acts as the mounting fixture for a plurality of elements 5a which act as a boundary against leakage between the shaft 20a and seal body 30a. Sealing the elements 5a from the seal body 30a is the o-ring 9a. Between the elements 5a are spacers 6a and 7a. The elements 5a and spacers 6a and 7a are held against the o-ring 9a by the pusher ring 11 which is held in place by four cap screws 12.

This design as shown in FIG. 2, and as compared to FIG. 1, incorporates a pusher ring 11 and cap screws 12 to replace the mechanism, in FIG. 1, comprising the retaining ring 8, which is aligned and compressed by the snap ring 11. The obvious advantage is the elimination of the snap ring 8. The snap ring 8, in the device as shown in FIG. 1, is placed in position, and correspondingly removed, by means of special pliers. When installed and removed, the tensioning of the snap ring 8 poses a particular hazard to the mechanic, which is eliminated by the assembly of FIG. 2.

Figure 3:
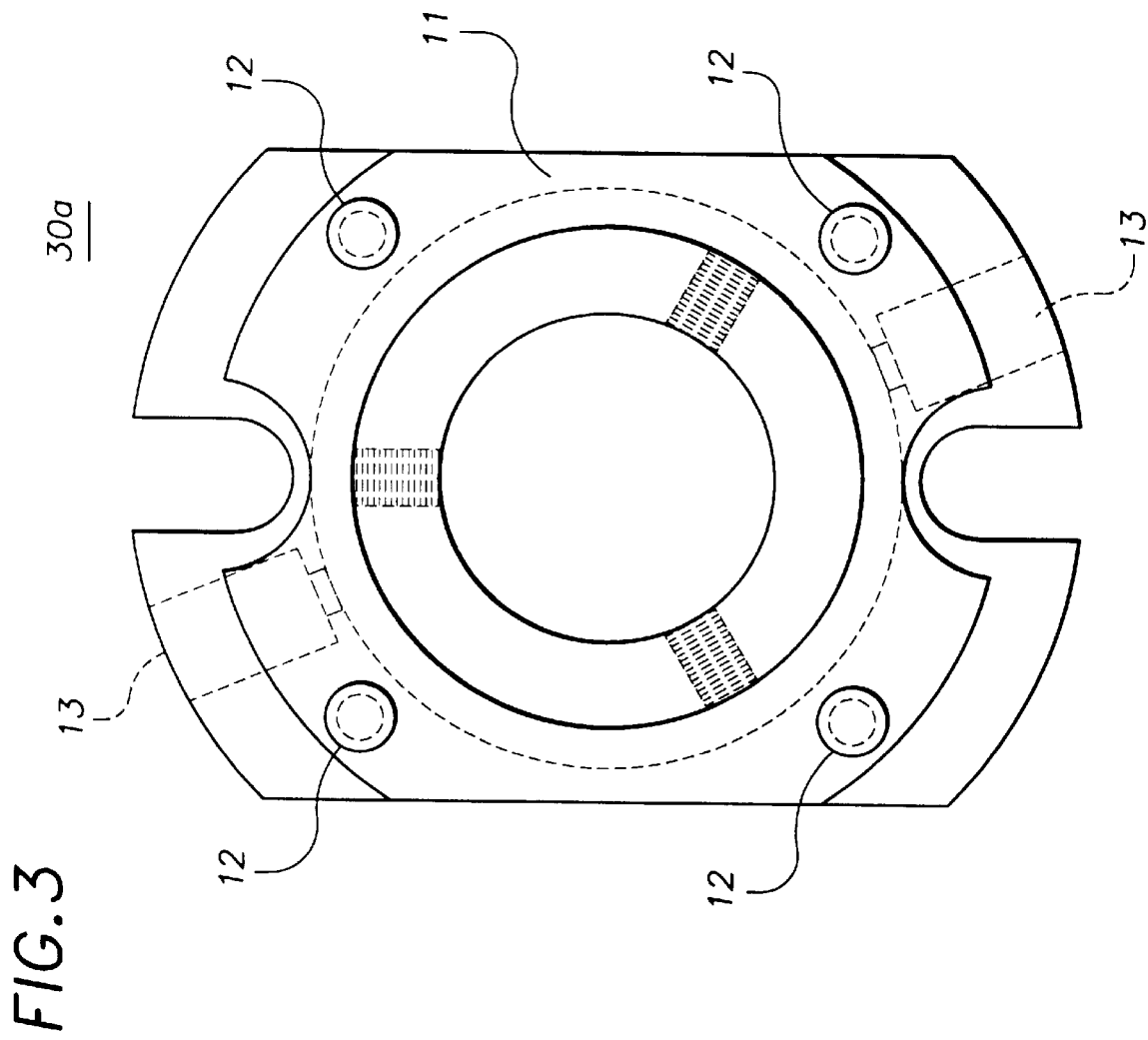
FIG. 3 is a transverse cross section of the seal at the pusher ring location showing the ports utilized to ensure gland clearance.

FIG. 3 shows the cross section of the seal 30a through the pusher ring 11, showing the relative location of the cap screws 12 and the feeler ports 13, which are used to gauge the compression of the gland plate 4, as a means of adjusting the compression on the seal 30a.

This design allows for a safe and easy assembly and repair of the seal when repairs are warranted without the danger of possible injury from any part of the seal.

What is claimed is:

1. In a mechanical seal having:

a drive sleeve having an inner perimeter surface sealingly fit over an outer surface of a shaft;

a gland plate extending circumferentially around said shaft and abutting against said outer surface around said shaft, wherein said gland plate acts as a mounting fixture for a plurality of elements extending from said gland plate to said drive sleeve, said elements acting as a boundary against leakage between said shaft and said gland plate;

an o-ring sealing said elements within said mechanical seal;

a plurality of spacers defined by areas between each of said elements;

the improvement which comprises:

a pusher ring holding said elements and said spacers against said o-ring, wherein said pusher ring is held in place by four cap screws, and wherein tightening of said cap screws allows said pusher ring to force said inner perimeter surface into sealing contact with said outer surface of said shaft without use of a snap ring.

* * * * *